US011144513B1

(12) United States Patent
Padisetty et al.

(10) Patent No.: US 11,144,513 B1
(45) Date of Patent: Oct. 12, 2021

(54) POLICY BASED MANAGEMENT FOR KEY-VALUE PAIRS

(71) Applicant: Amazon Technologies, Inc., Seattle, WA (US)

(72) Inventors: Sivaprasad Venkata Padisetty, Bellevue, WA (US); Projesh Chowdhary, Redmond, WA (US); Volodymyr Drozdenko, Redmond, WA (US); Manivannan Sundaram, Bothell, WA (US); Jun He, Seatac, WA (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 15/934,792

(22) Filed: Mar. 23, 2018

Related U.S. Application Data

(60) Provisional application No. 62/628,870, filed on Feb. 9, 2018.

(51) Int. Cl.
*G06F 16/185* (2019.01)
*G06F 16/11* (2019.01)
*G06F 16/23* (2019.01)
*G06F 16/28* (2019.01)

(52) U.S. Cl.
CPC .......... *G06F 16/185* (2019.01); *G06F 16/122* (2019.01); *G06F 16/2322* (2019.01); *G06F 16/2358* (2019.01); *G06F 16/282* (2019.01)

(58) Field of Classification Search
CPC .... G06F 16/27; G06F 16/24552; G06F 16/21; G06F 16/90335; G06F 16/182; G06F 16/282
See application file for complete search history.

(56) References Cited

U.S. PATENT DOCUMENTS

| 7,483,915 | B2* | 1/2009 | Thompson | G06F 8/24 |
| 7,647,329 | B1* | 1/2010 | Fischman | G06F 3/0607 |
| | | | | 707/999.1 |
| 7,716,180 | B2* | 5/2010 | Vermeulen | H04L 67/1097 |
| | | | | 707/626 |
| 7,739,239 | B1* | 6/2010 | Cormie | H04L 29/08135 |
| | | | | 707/626 |
| 7,904,423 | B2* | 3/2011 | Vermeulen | G06F 16/184 |
| | | | | 707/626 |

(Continued)

FOREIGN PATENT DOCUMENTS

EP      2737440      * 1/2014

OTHER PUBLICATIONS

Sloman Morris, "Policy Driven Management for Distributed Systems", Journal of Network and Systems Management, 1994.*

(Continued)

*Primary Examiner* — Daniel A Kuddus
(74) *Attorney, Agent, or Firm* — Lowenstein Sandler LLP

(57) ABSTRACT

A processing device determines that a parameter in a data store is associated with a parameter policy, wherein the parameter comprises a key-value pair and the parameter policy comprises metadata that affects a behavioral characteristic of the parameter. The processing device determines that a criterion included in the parameter policy is satisfied. The processing device determines one or more operations specified in the parameter policy and performs the one or more operations.

20 Claims, 14 Drawing Sheets

(56) References Cited

U.S. PATENT DOCUMENTS

| | | | | |
|---|---|---|---|---|
| 8,589,574 | B1* | 11/2013 | Cormie | G06F 3/0607 |
| | | | | 709/230 |
| 9,195,852 | B2* | 11/2015 | Dimitrakos | G06Q 10/10 |
| 9,632,764 | B2* | 4/2017 | Bryan | H04L 67/02 |
| 9,838,240 | B1* | 12/2017 | Cormie | G06F 16/134 |
| 2005/0050537 | A1* | 3/2005 | Thompson | G06F 16/289 |
| | | | | 717/165 |
| 2007/0156842 | A1* | 7/2007 | Vermeulen | G06F 16/184 |
| | | | | 709/217 |
| 2013/0212165 | A1* | 8/2013 | Vermeulen | H04L 67/42 |
| | | | | 709/203 |
| 2013/0346444 | A1* | 12/2013 | Makkar | G06F 16/90335 |
| | | | | 707/770 |
| 2014/0189681 | A1* | 7/2014 | Bryan | H04L 63/20 |
| | | | | 717/176 |
| 2015/0293984 | A1* | 10/2015 | Zolotusky, Jr. | G06F 16/27 |
| | | | | 707/634 |
| 2015/0296984 | A1* | 10/2015 | Fan | A47B 97/00 |
| | | | | 108/42 |
| 2017/0195165 | A1* | 7/2017 | Bryan | G06F 8/61 |
| 2018/0089249 | A1* | 3/2018 | Collins | G06F 16/2365 |

OTHER PUBLICATIONS

Johnson, E. "The right way to manage secrets with AWS" Segment Blog dated Aug. 28, 2017, 12 pages, downloaded from https://segment.com/blog/the-right-way-to-manage-secrets/ on Jan. 8, 2019.

* cited by examiner

```
{
    "$schema": "http://json-schema.org/draft-06/schema#",                                    250
    "properties": {
      "Attributes": {
        "id": "/properties/Attributes",
        "properties": {
          "Timestamp": {
            "description": "Expiration/Notification timestamp.",
            "examples": [
              "2016-12-02T21:34:33.000Z"
            ],
            "title": "The Expiration policy timestamp.",
            "type": "string"
          },
          "NotifyBefore": {
            "description": "defines notification time in units.",
            "examples": [
              "30"
            ],
            "title": "Notify before.",
            "type": "string"
          },
          "NotifyAfter": {
            "description": "defines notification time in units.",
            "examples": [
              "60"
            ],
            "title": "Notify after.",
            "type": "string"
          },
          "Unit": {
            "description": "Measurement unit for NotifyBefore and NotifyAfter attributes.",
            "examples": [
              "Day", "Hour"
            ],
            "title": "Notify after.",
            "type": "string",
            "enum": ["Day", "Hour"]
          },
        },
        "type": "object"
      },
      "Type": {
        "description": "Parameter policy type.",
        "title": "Parameter policy type.",
        "mandatory": true,
        "type": "string",
        "enum": ["Expiration", "ExpirationNotification", "NoChangeNotification"]
      },
      "Version": {
        "description": "Version of the parameter policy.",
        "mandatory": true,
        "title": "Version of the parameter policy.",
        "type": "string",
      }
    },
    "type": "object"
}
```

FIG. 2B

```
PutParameterRequest
{
        "Name": "parameterName",
        "Description": "Parameter with policies",
        "Value": "foo",
        "Type": "SecureString",
        "Overwrite": "True",
        "Policies":
        [
                {
                        "Type": "Expiration",
                        "Version": "1.0",
                        "Attributes": {
                                "Timestamp": "2016-12-02T21:34:33.000Z"
                        }
                },
                {
                        "Type": "ExpirationNotification",
                        "Version": "1.0",
                        "Attributes": {
                                "Before": "30",
                                "Unit": "Days"
                        }
                },
                {
                        "Type": "ExpirationNotification",
                        "Version": "1.0",
                        "Attributes": {
                                "Before": "15",
                                "Unit": "Days"
                        }
                },
                {
                        "Type": "NoChangeNotification",
                        "Version": "1.0",
                        "Attributes": {
                                "After":"20",
                                "Unit": "Days"
                        }
                },
                {
                        "Type": "NoChangeNotification",
                        "Version": "1.0",
                        "Attributes": {
                                "After":"24",
                                "Unit": "Hours"
                        }
                }
        ]
}
```

POLICY BASED MANAGEMENT FOR KEY-VALUE PAIRS

RELATED APPLICATION

This application claims the benefit of U.S. Provisional Application No. 62/628,870, filed Feb. 9, 2018, the entire content of is hereby incorporated by reference.

BACKGROUND

Certain types of resources such as configuration data and secrets may be referenced and/or used by many scripts, documents, applications, tools, services, and so on. Such resources may be maintained in a parameter store to facilitate easy management of and access to the resources at a single location. Secrets management, in particular, is important for companies. Improper management of a company's secrets (e.g., such as passwords) has resulted in a large number of high profile security breaches.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 2B illustrates an example parameter policy schema, in accordance with an embodiment of the present disclosure.

FIG. 4 illustrates an example of a "PutParameter" application programming interface (API) request with multiple policies.

DETAILED DESCRIPTION

Figure 1:
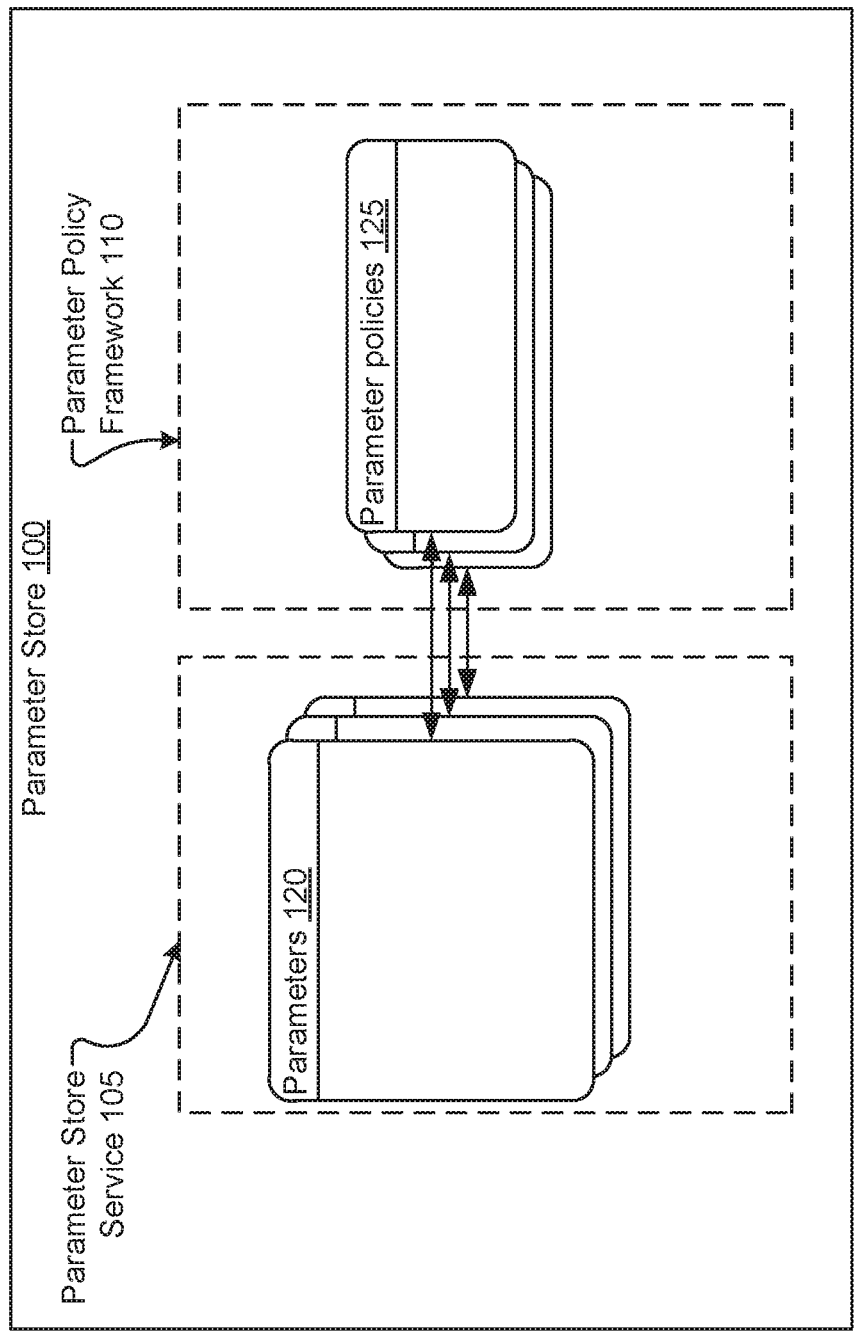
FIG. 1 illustrates parameters and parameter policies in a parameter store, according to one embodiment of the present disclosure.

The present disclosure relates to techniques for adding automated policies to resources that are represented as key-value pairs. Embodiments of the disclosure relate in particular to policies that are attached as metadata to configuration data and secrets in a parameter store or other key-value data store. The policies are not a part of the parameter (e.g., of a configuration parameter or secret parameter), but are instead additional objects, data structures and/or methods that provide workflows around the parameters. There are different types of parameter policies, and depending on the type of a parameter policy and how the parameter policy has been defined, that parameter policy performs operations associated with the parameter to which it is attached.

Users may select from one or more preexisting parameter policy types to add predefined parameter policies to a parameter. Users may additionally generate their own parameter policies, and attach such parameter policies to parameters using a plugin framework in embodiments. Parameter policies may include inline code that performs operations associated with parameters and/or may include references to and/or calls to known or unknown external functions such as serverless functions (also referred to as agile functions). The serverless functions may include unknown business logic. Serverless functions include functions that depend on third-party services (e.g., such as a backend as a service (BaaS)) or on custom code that is run in an ephemeral container (e.g., a function as a service (FaaS) such as Amazon Web Services (AWS) Lambda). An AWS Lambda function (or other FaaS function) can be triggered by other services (e.g., such as a parameter store service) and/or called directly from any web application or other application (e.g., such as a mobile application).

In one embodiment, a processing device executing a parameter store service receives a selection of a parameter stored in a hierarchical data store, wherein the parameter comprises at least one of a secret or a configuration parameter represented as a key-value pair. The processing device may alternatively receive a request to generate a new parameter. The processing device may additionally receive a request to attach a first parameter policy to the parameter, the request comprising a selection of a first parameter policy type associate with a parameter policy base class. The processing device receives first configuration information for the first parameter policy, the first configuration information comprising a first value for a first criterion. The processing device then generates the first parameter policy from the parameter policy base class and the first configuration information, wherein the first parameter policy comprises metadata that affects a behavioral characteristic of the parameter. The processing device then attaches the first parameter policy to the parameter, wherein the first parameter policy is specific to the parameter.

In one embodiment, a processing device executing a parameter store service determines that a parameter managed by the parameter store service (e.g., that is stored in a data store associated with the parameter store service) is associated with a parameter policy. The parameter may comprise a key-value pair and the parameter policy comprises metadata that affects a behavioral characteristic of the parameter. The processing device determines a criterion included in the parameter policy, and then determines whether the criterion is satisfied. Responsive to determining that the criterion is satisfied, the processing device determines one or more operations specified in the parameter policy and performs the one or more operations.

Embodiments are discussed with reference to parameter policies attached to parameters in parameter store. However, in alternative embodiments an alternative service or store other than the parameter store may be modified to include resource policies that function in the manner of the parameter policies described herein. Examples of such other services include a document service that stores documents and/or runbooks. Runbooks may describe the sequence of operations to be performed for an enterprise in particular scenarios, such as for disaster recovery. The operations in the runbook may be automatically performed by a document service. Additionally, documents or runbooks stored by the document service may have policies attached thereto. Such policies may correspond to any of the types of parameter policies described herein, but may be attached to resources such as documents or runbooks rather than to parameters.

FIG. 1 illustrates parameters 120 and parameter policies 125 in a parameter store 100, according to one embodiment of the present disclosure. Behavioral characteristics such as parameter expiration, external parameter validation, no-change notification for parameters, expiration notification of parameters, secret rotation for parameters, etc. may be provided by the parameter policies 125. The parameter store 100 may include a simple key-value store and a parameter store service 105 that interfaces with the key-value store. The parameter store 100 may be, for example, the AWS System Manager Parameter Store in an embodiment.

Parameters 120 may include secrets and configuration data in embodiments. Parameters may be encrypted (e.g., such as a secure string) or unencrypted (e.g., such as a plain text string, integer, Boolean value, etc.). The contents of encrypted parameters may be unknown to the parameter store 100. The parameter store service 105 may create and maintain secure string parameters, which may be parameters that have a plaintext parameter name and an encrypted parameter value. The parameter store 100 may use an encryption service (e.g., such as AWS key management service (KMS) to encrypt and decrypt the parameter values of secure string parameters.

The parameter store 100 includes a simple and highly optimized parameter store service 105 that allows customers to perform create, read, update and delete (CRUD) operations on their parameters 120. The parameter store service 105 provides such CRUD operations on parameters stored in a managed hierarchical data store such as a database. The parameter store 100 may include both the hierarchical data store and the parameter store service 105 that enables CRUD operations on the parameters in embodiments.

The parameter store service 105 may create, store, and manage data as parameters with values. Users can create a parameter in parameter store 100 and use it in multiple applications and services subject to policies and permissions that you design. When a user wants to change a parameter value, they can change one instance, rather than managing an error-prone change to numerous sources. Parameter store 100 supports a hierarchical structure for parameter names, so parameters can be qualified for specific uses.

In addition to storing parameters 120 in a secure fashion, the parameter store 100 allows customers to add behavioral characteristics to their parameters 120 in the form of parameter policies 125 in embodiments. The parameter store 100 disambiguates between parameters 120 and their associated parameter policies 125. In embodiments, parameter policies 125 are persisted in a data store (e.g., a database such as a distributed database (DDB)) for the live time of the associated parameter 120. The parameter policies 125 may be stored in the same data store as the associated parameters 120 or in a different data store.

Parameter policies 125 may be metadata that is attached to or associated with parameters 120 to add behavioral characteristics to the parameters 120. Described in embodiments herein is a new functionality in the parameter store 100 that will allow adding new features without affecting core functionality of the parameter store service. Each parameter 120 may include its own distinct parameter policies 125 that have been set up for that parameter. During a parameter create operation and/or a parameter update operation, different parameter policies 125 can be attached to a parameter 120. The attached parameter policies 125 may be enforced by a parameter policy infrastructure or framework 110 built on top of and/or separate from the parameter store service 105 for the parameter store 100. By providing a separate framework for parameter policies 125 than is used for the storage, access and use of parameters in the parameter store 100, embodiments keep service code for both the parameters 120 and the parameter policies 125 simple and allow adding new parameter policies in the future. The parameter policy framework 110 may include submit methods for attaching parameter policies to parameters and apply methods for determining when to perform operations associated with a parameter and/or for performing such operations. In some embodiments, the parameter policy framework 110 includes a plugin framework that enables users to generate their own custom parameter policies and input such parameter policies into the parameter store 100 for attachment to one or more parameters 120.

In some implementations, parameter polices 125 may be viewed as a set of criteria and/or actions that get applied on resources (e.g., parameters such as configuration data or a secret) that is already in a data store associated with a parameter store (e.g., such as the AWS Parameter Store). There are multiple different kinds of parameter policies 125, some of which are described herein. Some examples include an expiration policy (also referred to as a time-to-live (TTL) policy) for a parameter, an expiration notification policy for a parameter, and a no-change notification policy for a parameter. Other example parameter policies 125 include a validation policy that lets a user specify a custom lambda function to validate any change in a parameter value, a secret rotation policy that can trigger some value rotation workflow after a specified interval, and so on. In embodiments, users may manage the parameter policies 125 directly, without modifying the parameters 120 to which the parameter policies 125 are attached.

The parameter policy framework 110 may monitor parameter policies periodically or continuously, and may determine whether the criteria of any such monitored parameter policy 125 has been satisfied. Responsive to determining that the criterion of a parameter policy 125 has been satisfied, the parameter policy framework 110 may perform one or more operations specified in that parameter policy 125.

In embodiments, each parameter policy 125 may be represented as a Javascript Object Notation (JSON) document or JSON fragment that will have particular type and version fields. Also, a parameter policy may have an optional list of attributes. The list of attributes may be different for different parameter type and version combinations.

Below is an example of a JSON document for an expiration policy:
{
 "Type": "Expiration",
 "Version": "1.0",
 "Attributes": [
  "Timestamp": "2016-12-02T21:34:33.000"
 ]
}

As shown in the example, the expiration policy includes an expiration policy type, a version number of 1.0 and a timestamp of 2016-12-02T21:34:33.000. The timestamp may specify when the associated parameter policy is to be deleted from the hierarchical data store managed by the parameter store service. When a current time is past the timestamp (e.g., timestamp is in the past), then the expiration parameter may perform or trigger one or more operations to remove the associated parameter from the parameter store.

Parameters can be managed and retrieved, for example, using the Powershell or a command line interface (CLI) (e.g., such as AWS Tools for PowerShell, or the AWS CLI). In an example, when a new parameter is to be created, a command similar to the following may be run:
 aws ssm put-parameter --name dbserver --type string --value server.domain.local To take advantage of the new capabilities offered by parameter policies 125, a new parameter may be created, and policies 125 may be attached "in-line" with it. The policy attached to the parameter is specific to the parameter to which it's attached. Parameter policies may or may not be managed as separate resources. In example, parameter policies may be viewed as being an attribute of the parameter on which they're defined. Parameter policies 125 may be added to a policy table or data structure, and the policies in the table may be checked periodically by the parameter policy framework 110 to determine whether criteria in any of the policies have been satisfied. The parameter policy framework 110 may perform operations specified in a parameter policy if a criterion of that parameter policy has been satisfied.

In embodiments, the parameter store 100 may be integrated with one or more additional services that natively deliver encryption, notification, monitoring, and/or audit capabilities. Examples of such additional services include AWS Key Management Service (AWS KMS), Amazon Simple Notification Service (Amazon SNS), Amazon CloudWatch, and AWS CloudTrail.

Three examples of different types of policies available for parameters, include the aforementioned expiration policy, expiration notification policy and no-change policy. In embodiments, notifications may be published to an external service (e.g., such as CloudWatch Events). An event flow can be built that performs automated remediation, or notifies operations teams that manual intervention is called for in embodiments.

Below are example APIs associated with the generation of parameter policies and/or the triggering of parameter policies. A first example is an example of a "PutParameter" API that may be called to create or update a parameter. The "PutParameter" API call may include one or more specified policies. Such specified policies may be included in the API call as one or more inline JSON documents or JSON fragments.

PutParameter API—creates or updates a parameter.
{
 name: "fully qualified parameter name",
 type: "String/StringList/SecureString",
 value: "<value>",
 description: "some note",
 keyId: "KMS Key Id",
 overwrite: True/False,
 allowedPattern: "regex",
 policies: "{inline JSON document}"
}

An example call to the "PutParameter" API that adds an expiration policy to a parameter is set forth below.
 aws ssm put-parameter --name DatabaseName --value mydb --policies
 '{"Type": "Expiration","Version":"1.0","Attributes": {"Timestamp":"2017-12-01Z01:15:00.000"} }'

This API call includes a JSON fragment that specifies that an expiration policy should be attached to the new or updated parameter, and that the expiration policy is to have an expiration date and time of 2017-12-01Z01:15:00.000.

A second example is an example of a "DescribeParameters" API that provides information about existing parameters.
{
 "filters": [{
  "key": "Name/Type/KeyId",
  "values": ["value1", . . . "value10"]
 }],
 "parameterFilters": [{
  "key": "Name/Type/KeyId/Tag",
  "option": "BeginsWith/Equals/Recursive",
  "values": ["value1", . . . "value10"]
 }],
 "nextToken": "next token for next page",
 "maxResults": 50
}

An example result of the "DescribeParameters" API call is set forth below.
{
 parameters: [
  {
   "name": "/path/parametername",
   "type": "String/StringList/SecureString",
   "lastModifiedAt": "2017-01-01 12:23:23T",
   "lastModifedBy": "user arn",
   "policies": [
    '{"Type":"Expiration","Version":"1.0","Attributes": {"Timestamp":"2017-12-01Z01:15:00.000"}}',
    . . .
   ]
  }
 ]
}

Figure 2A:
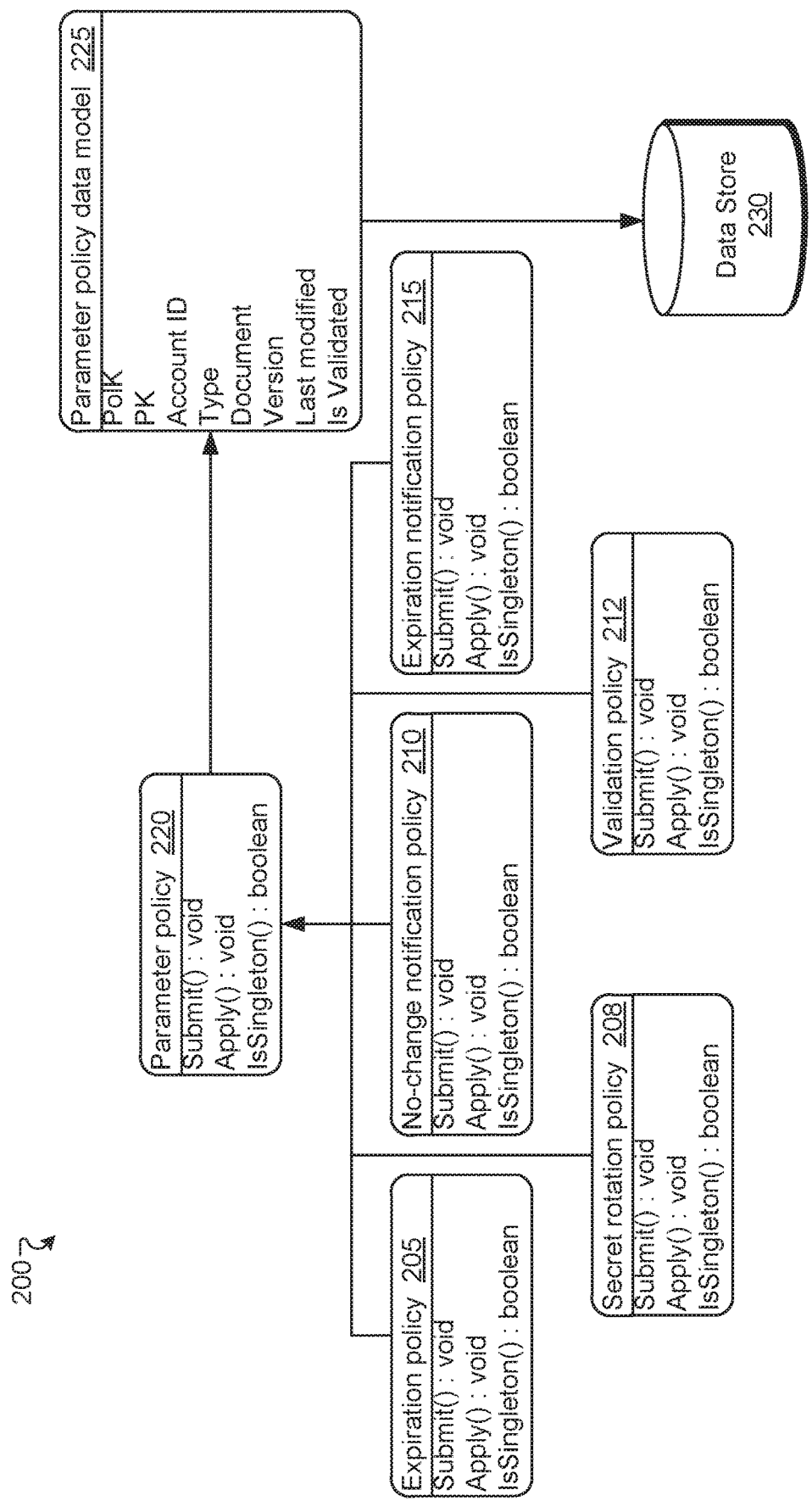
FIG. 2A illustrates an organizational structure for parameter policies, according to one embodiment of the present disclosure.

FIG. 2A illustrates an organizational structure for parameter policies, according to one embodiment of the present disclosure. In embodiments, there may be different parameter policy classes for each type of parameter policy. Examples include an expiration policy class 205, a secret rotation policy class 208, a no-change notification policy class 220, a validation policy class 212 and an expiration notification policy class 215.

An expiration policy may be generated from an expiration policy class 205. An expiration policy (also referred to as "time-to-live" policy) enables a user to define how long a parameter should be available, after which the parameter is expired. By expiring parameters, users can avoid using long-life credentials, which puts an application's security at risk. This policy deletes a parameter after the parameter expires. An expiration time may be set by a user in the policy value. The expiration time can be updated at any time by updating the policy. Updating the parameter itself does not affect the expiration time in some embodiments. Alternatively, updating the parameter may cause the expiration time to change.

Expiration policy validation may be triggered by a distributed job scheduling (DJS) job that scans a policy table periodically and checks if the policy value (expiration time) of the expiration policy is in the past. If the expiration policy is in the past, the DJS job will delete the expired parameter. In an example, the DJS job may be scheduled to run as often as every 5 minutes, or on some other greater or lesser frequency.

An expiration notification policy may be generated from an expiration notification policy class 215. Using the expiration notification policy, a user can choose to get notified at a specified duration before a parameter is set to expire using the expiration notification policy. Services that are dependent on credentials stored in a data store (e.g., parameter store) need to ensure that the rug isn't pulled out from underneath them, so to speak. Parameter expiration notifications may be sent, for example, to an external event service. A user can create a rule in the event service to listen for this event and trigger an automated mechanism in embodiments.

If the expiration notification policy is set for a parameter, an expiration notification will be generated and sent to one or more destinations (e.g., to one or more users) a specified number of days, hours and/or minutes before the associated parameter expires. This policy may depend on the expiration policy to be present for a given parameter. If the expiration policy is not set, an exception or error may be generated (e.g., an input "IncompatiblePolicyException" exception may be triggered by the "PutParameter" API).

To avoid runtime dependencies between policies, the expiration value provided (e.g., a number of days prior to expiration set by a user) may be converted to an exact timestamp and stored in the data store, based on the timestamp value of the associated expiration policy assigned to the parameter for which the expiration notification policy is created.

Validation of the expiration notification policy may be triggered by a DJS job that scans the policy table periodically and checks if the timestamp associated with the expiration notification policy is in the past. If this is the case, the event associated with the expiration notification policy will be initiated. After initiation, a validation field (e.g., a "Policy.IsValidated" field) may be set to TRUE and may not be considered during consecutive scans.

A no-change notification policy may be generated from a no-change notification policy class 210. The no-change notification policy enables notifications to be generated if a parameter hasn't changed during a specified time period. Developers, engineers, and security professionals may need to know when long-life credentials haven't been changed for a while, so that they can take action to secure applications. For example, perhaps credential rotation is still a manual process, or may be an automated credential rotation process that is in place has temporarily failed.

Resources (e.g., parameters) may have a last modified date value. Validation of the no-change notification policy may be triggered by the DJS job that scans the policy table periodically and checks if the last modified date value (e.g., "SsmParameters.LastModifiedDate") is within a notification boundary. After initiating an event associated with the no change notification policy, the validation field for the policy (e.g., "Policy.IsValidated" field) may be set to TRUE and may not be considered during consecutive scans.

A custom validation policy may be generated from the validation policy class 212. The custom validation policy is a policy for which a user can provide a custom validation (e.g., a serverless function or similar mechanism) that gets applied when an associated parameter value gets updated. There are often use cases where an enterprise runs some complex business logic that is specific to that enterprise. The enterprise may wish to run this complex business logic prior to committing a new value for a particular parameter (e.g., for a particular configuration or secret). The custom validation policy enables a user to provide their serverless function or other similar function for execution when a parameter value is to be verified. The user-provided (e.g., user-hosted) function may be invoked when a parameter is generated and/or modified. The user-provided function may then return a result such as a Boolean result (e.g., TRUE or FALSE). Based the provided result, the new or modified value for the parameter may or may not be committed. For example, if a Boolean result is TRUE, then the parameter value may be committed. If a Boolean result is FALSE, then the parameter value may not be committed and/or an error notification may be generated.

In an example, a customer may provide a function (e.g., a serverless function) that checks whether a path is a network path or a local path, and validates a parameter value of the parameter is a network path. In this case, when the parameter value is changed or added, the function is executed and provided the parameter value. The function then determines whether the parameter value is a network path. This function may be triggered whenever the parameter with the custom validation policy attached to it is updated, for example.

Embodiments enable enforcement and receipt of notifications for credential rotation using policies attached to parameters in a parameter store. It's well-established that credential rotation improves the security of applications. Embodiments provide a parameter store (e.g., AWS Systems Manager Parameter Store) that provides a secure hierarchical storage for configuration data management and secrets management. Data such as passwords, database strings, and license codes may be stored in parameter values, as plaintext or encrypted, to be referenced by name. Each parameter can be individually tagged, and secured for access at the operation, parameter, tag, and path levels.

A custom secret rotation policy (or other resource rotation policy) may be generated from the secret rotation class 208. The resource rotation policy is a policy where a user can provide custom code (e.g., via a FaaS) that rotates the value of a given parameter to a new value. The resource rotation policy may be useful, for example, for rotating secrets. The semantics and/or contents of the secrets may not be known by the system. For example, the secret may be an SQL server password, a webserver administration name, and so on. The resource rotation policy may be triggered after a set amount of time (e.g., when a set timestamp occurs). The resource rotation policy may invoke a rotation workflow in which an enterprise (or other customer) who deposited a secret in the parameter store is replaced with a new secret. The system may not have information on what the secret is or how to rotate the secret. However, the system may provide a framework for resource rotation, and may invoke a serverless function or other similar rotation function that may receive the existing secret as an input and provide a new secret as an output. The output secret may then be used to update the parameter value for a parameter for which the resource rotation policy was triggered.

As described above, the custom validation policy and resource rotation policy are two types of policies that invoke third party functions, which may be controlled by a third party and unknown to the system (e.g., to the parameter store). For example, a policy may include a webhook that invokes code that triggers a serverless function. Another type of function that may be invoked is an automation document. An automation document may perform one or more operations as part of a workflow.

The above described policies are only a few possible policies that may be attached to resources (e.g., parameters) such as configurations and secrets. Other types of policies are also envisioned. Such other policies may be user generated policies and/or system provided policies. Additionally, such other policies may include other policies that invoke third party functions such as serverless functions. For example, the parameter store may be configured to accept policy plugins that are user generated.

Parameter policies may be derived from a parameter policy base class 220 and may hold a reference to a serializable parameter store data model object 225. This will make the service code generic and completely oblivious to what policy is applied to a given parameter. In an embodiment, the parameter policy data model 225 may include fields for an account ID, a parameter policy type, a document value, a version number, a last modified timestamp, an "is validated" field that indicates whether the parameter policy has been validated or not, and/or other fields. Generated parameter policies may be stored in a data store 230.

In some embodiments, each parameter policy will implement three methods, as set forth below:
1. IsSingleton( ): boolean—will be the indication as to whether the policy type is a singleton.
2. Submit( ): void—will initialize a policy (submit it to action).
3. Apply( ): void—will be called asynchronously by workers to validate/enforce a policy.

For example, for an expiration notification policy the "Apply( )" method may be called by a worker or process to check if the associated parameter is within a notification time range, and/or may send a notification to the customer. Some types of parameter policies such as an expiration policy may be a singleton policy. For a singleton policy, only one instance of that particular type of parameter policy may be attached to a particular parameter. Other policies may have multiple instances attached to a resource (e.g., to a parameter). An example of a parameter policy type that is a singleton policy is an expiration policy. This may be enforced during policy validation.

FIG. 2B illustrates an example parameter policy schema 250, in accordance with one embodiment of the present disclosure. As shown, the example parameter policy schema 250 includes a parameter policy type field with three possible types of parameter policies, including an expiration parameter policy type, an expiration notification parameter policy type, and a no-change notification parameter policy type. Other example parameter policy schemas may additionally or alternatively include other parameter policy types such as a validation parameter policy type and/or a resource rotation (e.g., secret rotation) parameter policy type. The parameter policy schema 250 additionally includes a timestamp field, a notify before field and a notify after field. The notify before field sets forth an amount of time before the timestamp to generate a notification. The notify after field sets forth an amount of time after the timestamp to generate a notification. The parameter policy schema 250 may additionally include an external call field that can be used to specify a call to make on an external API, serverless function, and so on.

Below is an example implementation of an expiration policy attached to a parameter. The "Type" property is set to "Expiration". Next, the "Attributes" property contains a JSON object, which has a "Timestamp" attribute containing an RFC 3339-compliant UTC date-time string.

```
read -r -d "Policy<<EndPolicy
[{
"Type": "Expiration",
"Version": "1.0",
"Attributes": {
"Timestamp": "2018-01-25T21:30:00.000Z"
}
}]
EndPolicy
aws ssm put-parameter --region us-west-2 --name
    dbserver --type String --value
server.domain.local --policies $Policy
```

As set forth in the example expiration policy, the policy has an "expiration" type, a version of 1.0, and a timestamp. The parameter policy framework 110 may determine that an associated parameter is to expire at the timestamp, and may then perform one or more operations to delete the associated parameter. The parameter policy framework 110 may then delete the expiration policy that was attached to the parameter that was deleted.

Figure 3:
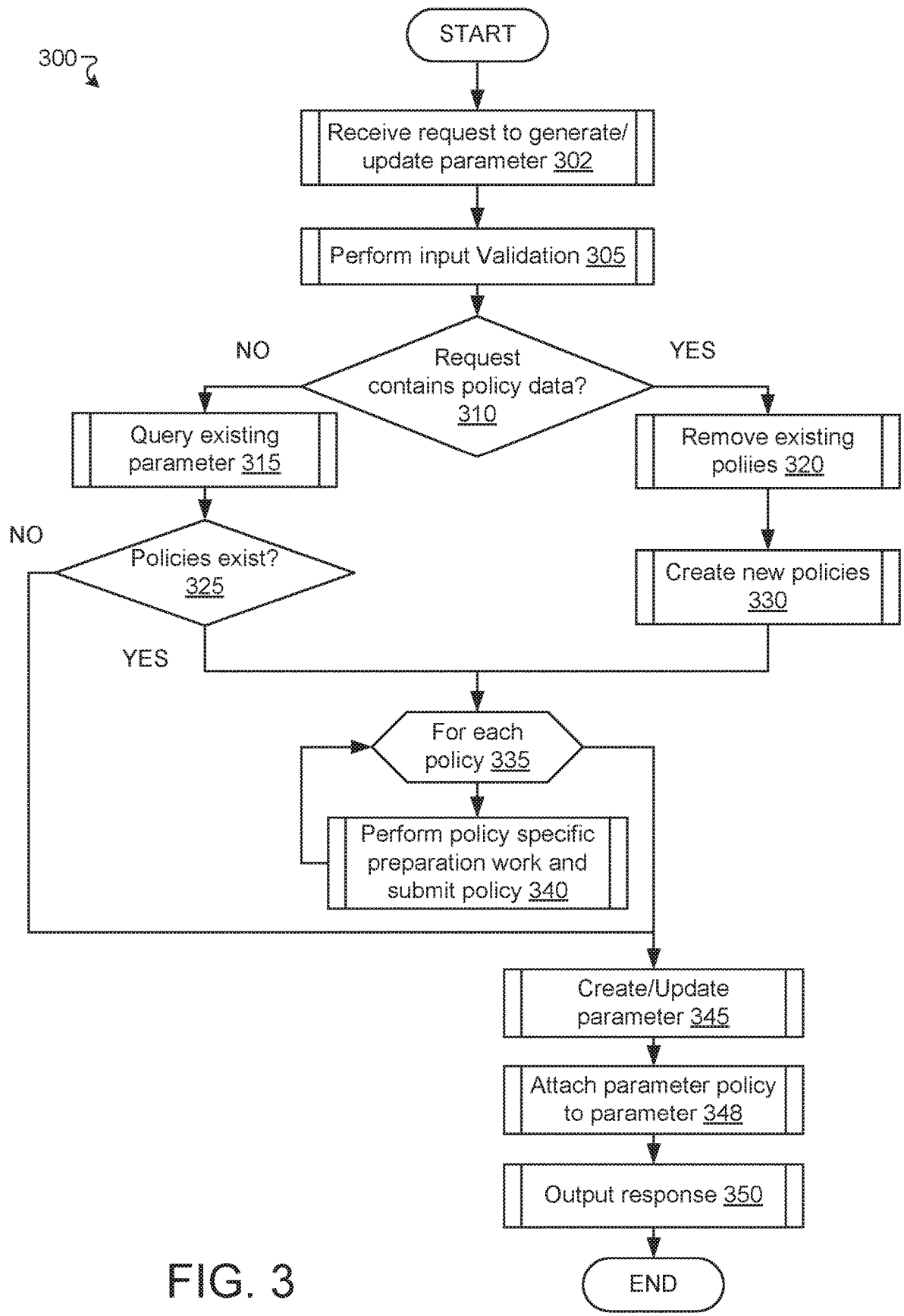
FIG. 3 is a flow chart illustrating one embodiment for a method of generating a parameter and attaching parameter policies to the parameter.

FIG. 3 is a flow chart illustrating one embodiment for a method 300 of generating a parameter and attaching parameter policies to the parameter. In an example, method 300 may be performed responsive to invocation of a "PutParameter" API that generates and/or updates parameters. The code for the "PutParameter" API may include functionality both for generating and updating parameters as well as generating parameter policies and attaching such parameter policies to new and/or updated parameters.

At block 302 of method 300, processing logic may receive a request to generate and/or update a parameter (e.g., via a call to the "PutParameter" API). At block 305, processing logic performs input validation. The input validation may include parsing the call to the parameter update/generation API (e.g., "PutParameter" API) and checking that the call conforms to API call rules for the API. The input validation may additionally or alternatively include performing pattern matching and/or other validation operations to determine that the received request complies with specified patterns, rules, criteria, and so on.

At block 310, assuming that the input is validated, processing logic determines whether the received request (e.g., API call) contains data for any policies (e.g., if the API call includes a JSON document or JSON fragment specifying a policy to generate and attach to the parameter). If the request contains policy data, the method proceeds to block 320. If the request does not contain any policy data, the method continues to block 315.

At block 320, processing logic may remove existing policies from the parameter (if any such policies exist). At block 330, processing logic then creates one or more new parameter policies based on the parameter policy data included in the request. For example, the request may be formatted as set forth in the above example API calls, and may specify that an expiration policy, an expiration notification policy, etc. are to be attached to the parameter. The request may include a JSON fragment or JSON document that identifies a parameter policy type and a timestamp, for example.

At block 315, processing logic queries the parameter store to determine if the parameter already exists. At block 325, processing logic determines whether policies are already attached to the parameter. If one or more parameter policies are already attached to the parameter, the method proceeds to block 335. Otherwise the method advances to block 345.

At block 345, processing logic executes a loop that is to be performed for each policy, and advances to block 340. At block 340, processing logic performs policy specific preparation work for a particular parameter policy and then submits the policy. The parameter policy preparation work may include generating a parameter policy object or data structure based on a parameter policy base class and the parameter policy data that was either included in the request (e.g., in the API call) or that was already included in preexisting parameter policies, for example. The method then returns to block 335. If there are additional policies that have not yet been processed by the loop, the method continues to block 340. If all policies have been processed by the loop, the processing logic exits from the loop and the method advances to block 345.

Some parameter policies have a specified amount of time from a particular date and time as a criterion. For such parameter policies, the preparation work may include calculating a time stamp from the particular date and time and the specified amount of time. For example, an expiration notification policy may specify that a user is to be notified 72 hours before a parameter expires. For such a notification policy, the preparation work may include computing a timestamp that is 72 hours before a timestamp associated with an expiration policy.

At block 345, processing logic creates the parameter (or updates the existing parameter) based on data included in the request. At block 348, processing logic attaches the parameter policy or parameter policies to the parameter. In some embodiments, the operations of blocks 345 and 348 are combined and performed together. At block 350, a response to the original request is output.

The diagram of FIG. 3 implies that a parameter policy can be overwritten during a parameter update. If no parameter policies are given in the received request (e.g., "a PutParameter" API call), the existing policies may be applied to the updated parameter.

In some embodiments, in order to remove all policies from an existing parameter, a singleton empty policy type may be created that will delete all parameter policy records (e.g., on an "EmptyPolicy.Submit( )" call that calls a method that deletes parameter policy records). A policy parser implementation may make sure that the empty policy is not combined with any other policies in a request. If the empty policy instruction and other policies are included in a request, then the request may fail the input validation performed at block 305. One example a CLI call to remove all policies may have the following format:

aws ssm put-parameter
--name p --type String --value "123"
--policies "[{ }]"

Another example CLI call to remove all policies may have the following format:

aws ssm put-parameter
--name p --type String --value "123"
--policies '[{"Type": "EmptyPolicy", "Version": "1.0" }]'

An example of a "PutParameter" API call 400 with multiple parameter policy data for multiple parameter policies is provided in FIG. 4. The example "PutParameter" API call 400 may be received at block 302 of method 300, and may cause an expiration policy with an expiration time stamp of 2016-12-02T21:34:33.000 to be generated. The API call 400 may additionally cause a first expiration notification policy with a timestamp that is 30 days before the expiration time stamp and a second expiration notification policy with a timestamp that is 15 days before the expiration timestamp to be generated. The API call 400 may additionally cause a first no-change notification policy with a timestamp that is 20 days after the associated parameter was last modified and a second no-change notification policy with a timestamp that is 24 hours after the associated parameter was last modified to be generated.

Embodiments are described herein with reference to inline policies. However, it should be understood that policies other than inline policies may also be applied to parameters and/or other resources. For example, a policy document (e.g., an "SSMParameterPolicy" document) may be generated, and may be managed by a document service such as a systems manager document service (e.g., the AWS Systems Manager (SSM) document service).

Below is an example of how to add an expiration notification policy to a new parameter, using the AWS CLI. The "--policies" parameter accepts a JSON array of individual policies that may be applied to the new parameter, or parameter version. The policies can be mixed and matched, of any supported policy type. In this particular example, the "Type" property is set to "ExpirationNotification", indicating that it is for an expiration notification policy. Under the "Attributes" JSON property, the "Unit" attribute is specified with a value of "Days". The "Before" attribute, which specifies how many days prior to the expiration the notification should be sent, should be set to a value before the parameter's expiration. In embodiments, for the expiration notification policy to work, the expiration policy should first be set for a parameter; otherwise, the parameter never expires.

read -r -d "Policy<<EndPolicy
[{
"Type": "ExpirationNotification",
"Version": "1.0",
"Attributes": {
"Before": "15",
"Unit": "Days"
}
},
{
"Type": "Expiration",
"Version": "1.0",
"Attributes": {
"Timestamp": "2018-01-25T21:30:00.000Z"
}
}]
EndPolicy
aws ssm put-parameter --region us-west-2 --name dbserver --type String --value
server.domain.local --policies $Policy Below is an example of how to add a no-change notification policy, using the AWS CLI. This parameter policy has a "Type" property of "NoChangeNotification", which indicates that it is for a no-change parameter policy. The policy's attributes specify the "Unit" property, which can be measured in hours or days. Also, the attributes specify the "After" attribute, which determines how many hours or days should pass before a notification is sent, if the parameter exceeds its age. A parameter's age is determined by a "LastModifiedDate" property of the parameter.

```
read -r -d "Policy<<EndPolicy
[{
"Type": "NoChangeNotification",
"Version": "1.0",
"Attributes": {
"After":"24",
"Unit": "Hours"
}
}]
EndPolicy
aws ssm put-parameter --region us-west-2 --name
    dbserver --type String --value
    server.domain.local --policies $Policy
```

FIGS. 5-12 are flow diagrams of various embodiments of methods for generating and applying parameter policies. The methods are performed by processing logic that may include hardware (circuitry, dedicated logic, etc.), software (such as is run on a general purpose computer system or a dedicated machine), firmware, or some combination thereof. In one implementation, the methods may be performed by a server computing device executing a parameter store service, such as computing device 1300 of FIG. 13.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

Figure 5:
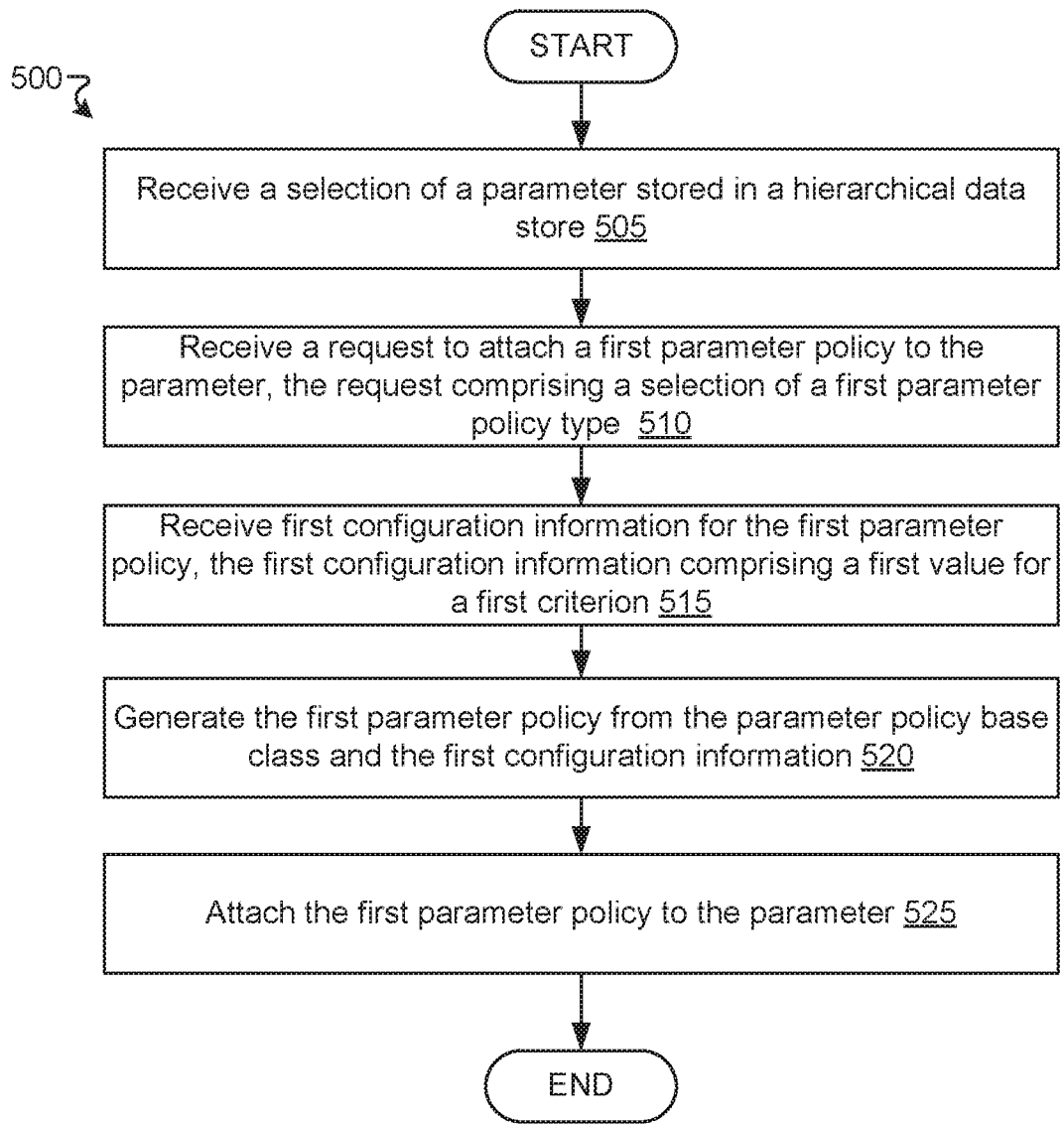
FIG. 5 is a flow chart illustrating one embodiment for a method of generating attaching a parameter policy to a parameter.

FIG. 5 is a flow chart illustrating one embodiment for a method 500 of generating and attaching a parameter policy to a parameter. At block 505 of method 500, processing logic receives a selection of a parameter stored in a hierarchical data store (e.g., in a data store managed by a parameter store service). The selection of the parameter may be included in an API call to update an existing parameter. Alternatively, processing logic may receive an API call to create a new parameter. In embodiments, the same API call (e.g., a "PutParameter" API call) may be used to generate new parameters and update existing parameters.

At block 510, processing logic receives a request to attach a first parameter policy to the parameter. The request may comprise a selection of a first parameter policy type included in a parameter policy base class. In one embodiment, the request to attach the parameter policy to the parameter is included in the API call. Accordingly, in embodiments blocks 505 and 510 may be combined.

At block 515, processing logic receives first configuration information for the first parameter policy. The first configuration information may comprise a first value for a first criterion to set in the first parameter policy. For example, the first configuration information may include a timestamp, or a specified amount of time before or after an expiration timestamp. The first configuration information may also include a reference to an external function, such as a serverless function. In one embodiment, the first configuration information is included in the API call. Accordingly, in embodiments blocks 505, 510 and 515 may be combined.

At block 520, processing logic generates the first parameter policy from the parameter policy base class and the configuration information. For example, processing logic may generate an expiration parameter policy having an expiration date and time that was included in the configuration information. At block 525, processing logic attaches the first parameter policy to the parameter.

Figure 6:
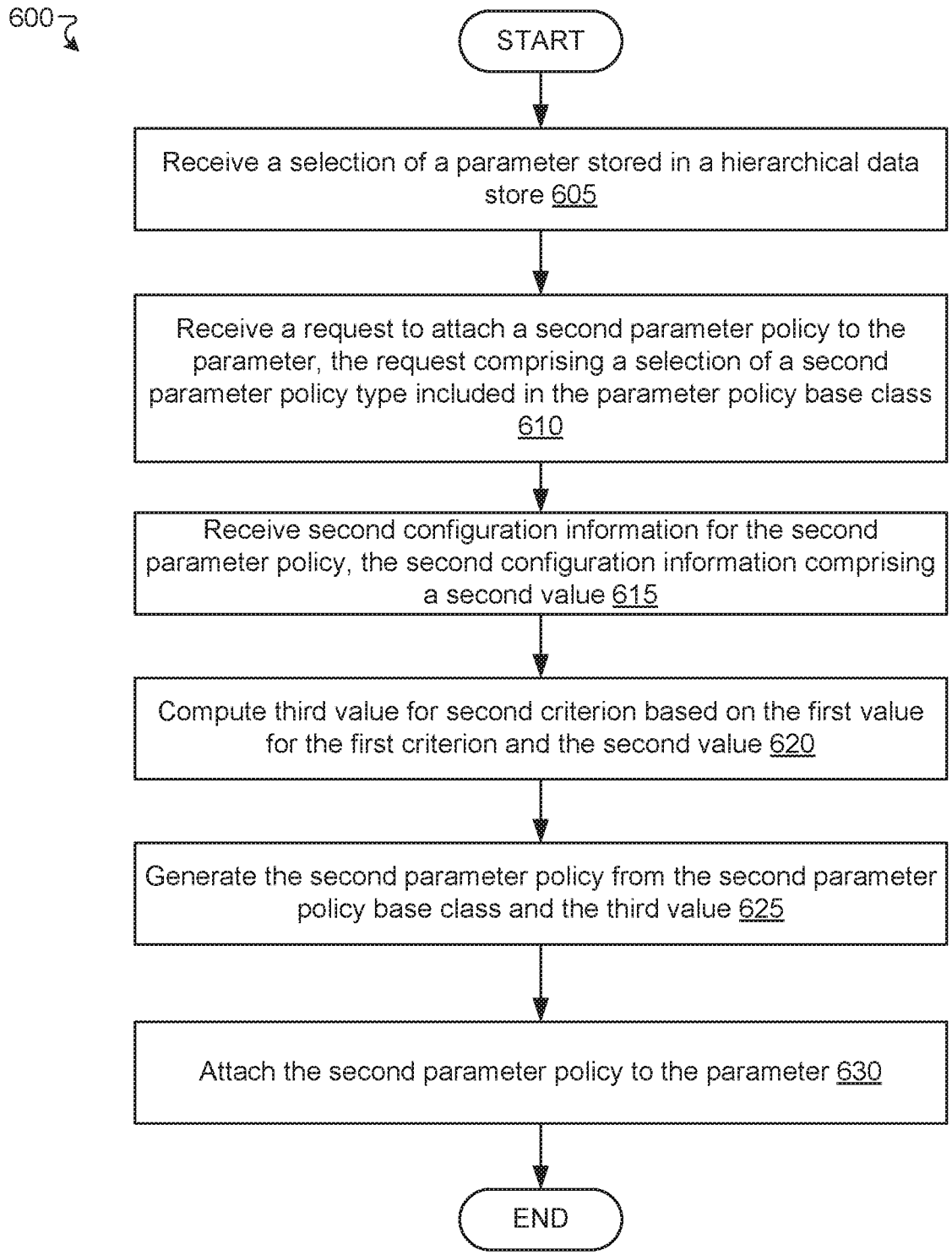
FIG. 6 is a flow chart illustrating another embodiment for a method of generating attaching a parameter policy to a parameter.

FIG. 6 is a flow chart illustrating another embodiment for a method 600 of attaching a parameter policy to a parameter. Method 600 may be executed together with or following execution of method 500 in embodiments. At block 605 of method 600, processing logic receives a selection of a parameter stored in a hierarchical data store (e.g., in a data store managed by a parameter store service). The selection of the parameter may be included in an API call to update an existing parameter. Alternatively, processing logic may receive an API call to create a new parameter.

At block 610, processing logic receives a request to attach a second parameter policy to the parameter. The request may comprise a selection of a second parameter policy type included in a parameter policy base class. The second parameter policy type may be different from the first parameter policy type. In one embodiment, the request to attach the parameter policy to the parameter is included in the API call. Accordingly, in embodiments blocks 605 and 610 may be combined.

At block 615, processing logic receives second configuration information for the second parameter policy. The second configuration information may comprise a second value for a second criterion to set in the second parameter policy. For example, the second configuration information may include a specified amount of time before or after an expiration timestamp. The second configuration information may also include a reference to an external function, such as a serverless function. In one embodiment, the second configuration information is included in the API call. Accordingly, in embodiments blocks 605, 610 and 615 may be combined.

At block 620, processing logic generates the second parameter policy from the parameter policy base class and the second configuration information. For example, processing logic may generate an expiration notification parameter policy. At block 625, processing logic attaches the second parameter policy to the parameter.

In embodiments, method 500 and method 600 may be combined. For example, a single API call may include selection of a parameter (or instructions to generate a new parameter) as well as a request to attach a first parameter policy and a second parameter policy to the parameter. The API call may additionally include first configuration information associated with the first parameter policy and second configuration information associated with the second parameter policy.

Figure 7:
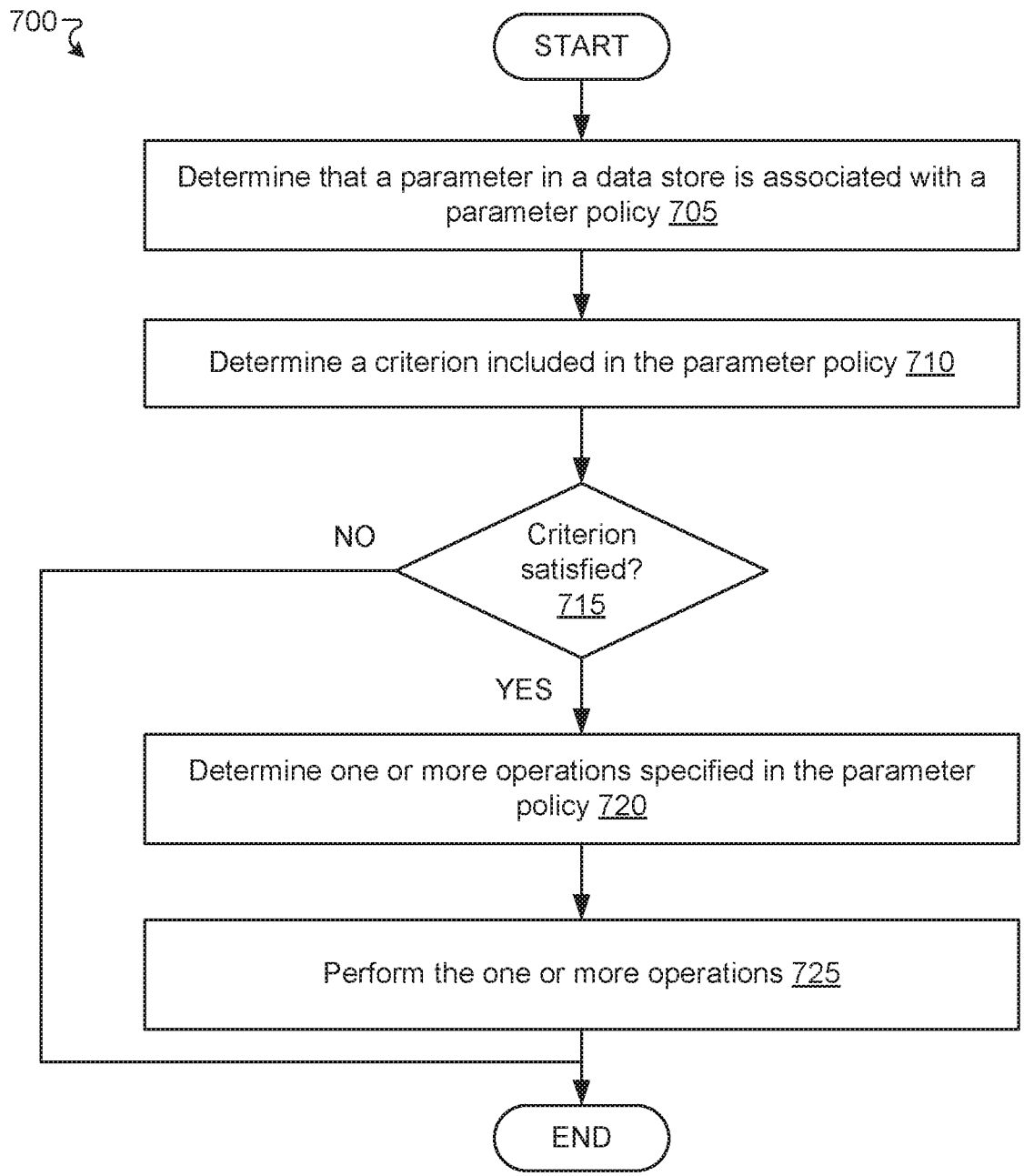
FIG. 7 is a flow chart illustrating one embodiment for a method of executing a parameter policy associated with a parameter.

FIG. 7 is a flow chart illustrating one embodiment for a method 700 of executing a parameter policy associated with a parameter. At block 705 of method 700, processing logic determines that a parameter in a data store is associated with a parameter policy. Processing logic may include logic (e.g., one or more methods) of a parameter policy framework that checks parameter policies periodically in embodiments. At block 710, processing logic determines that there is a criterion included in the parameter policy.

At block 715, processing logic determines whether the criterion included in the parameter policy is satisfied. For example, if the criterion is that a specified date and time is in the past, processing logic may determine whether a current date and time is later than the specified date and time of the criterion. If the criterion is not satisfied, the method ends. If the criterion is satisfied, the method continues to block 720.

At block 720, processing logic determines one or more operations specified in the parameter policy. The specific operation or operations may be based on a parameter policy type of the parameter policy. Each parameter policy type may have its own set of distinct operations to be performed. For example, an expiration policy may invoke a function that deletes a parameter. An expiration notification policy or a no-change notification policy may invoke a function that generates a notification. A parameter validation policy may include an instruction to make a call to an external function (e.g., a serverless function), where that call may include the parameter. A framework executing the validation policy may then receive a validation response, and may commit or roll back a change to a parameter based on the validation response. A secret rotation policy may include an instruction to make a call to an external function (e.g., a serverless function), where that call may include a current value of the parameter. A framework executing the secret rotation policy may then receive a new value for the parameter, and overwrite the original value for the parameter with the new value for the parameter.

Figure 8:
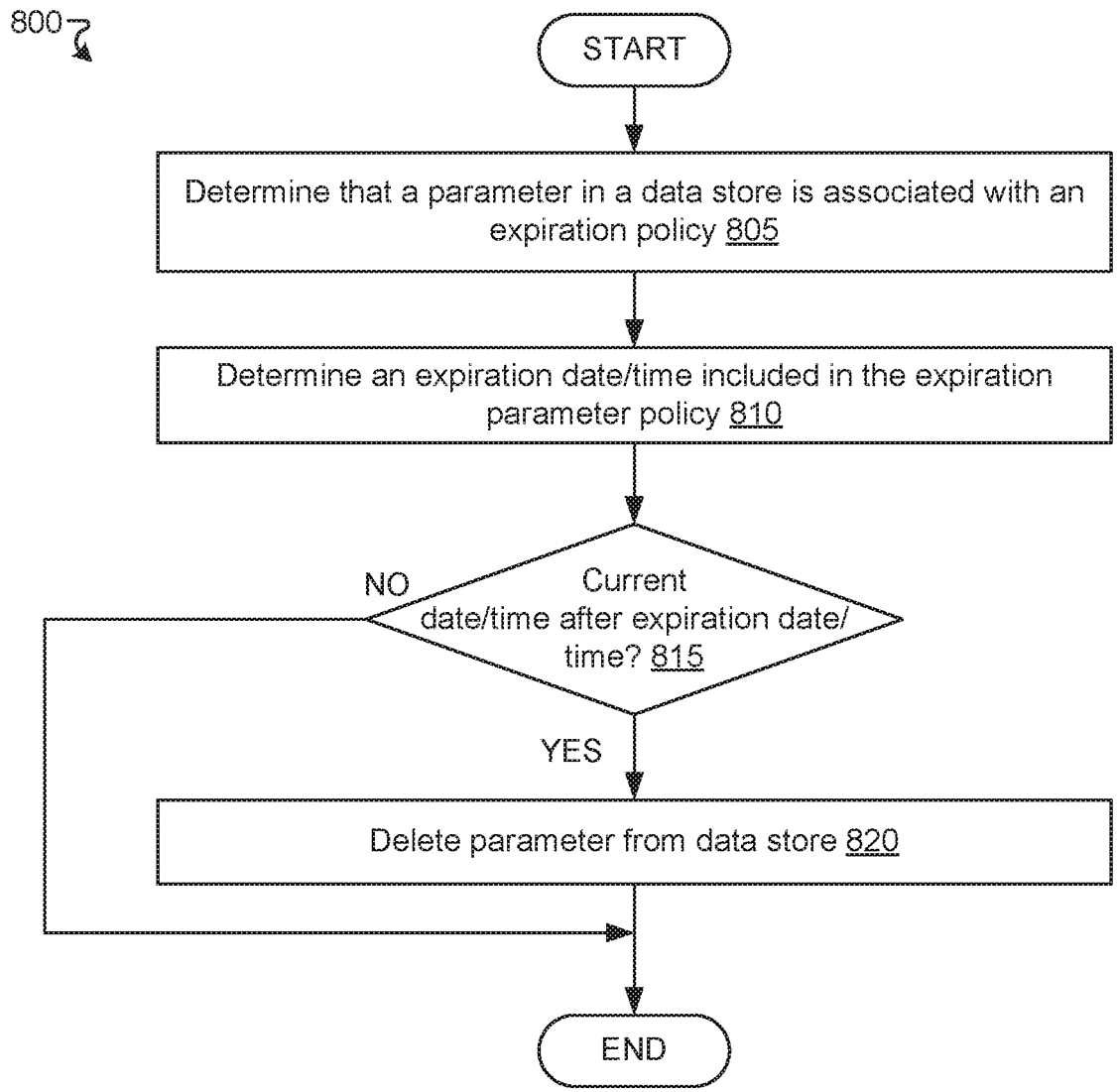
FIG. 8 is a flow chart illustrating one embodiment for a method of executing an expiration policy associated with a parameter.

FIG. 8 is a flow chart illustrating one embodiment for a method 800 of executing an expiration policy associated with a parameter. At block 805 of method 800, processing logic determines that a parameter in a data store is associated with an expiration parameter policy. At block 810, processing logic determines an expiration date/time (e.g., timestamp) included in the expiration parameter policy.

At block 815, processing logic determines whether a current date/time (e.g., timestamp) is after the expiration date/time. If the current date/time is not after the expiration date/time, the method ends. If the current date/time is after the expiration date/time, the method continues to block 820.

At block 820, processing logic deletes the parameter from the data store.

Figure 9:
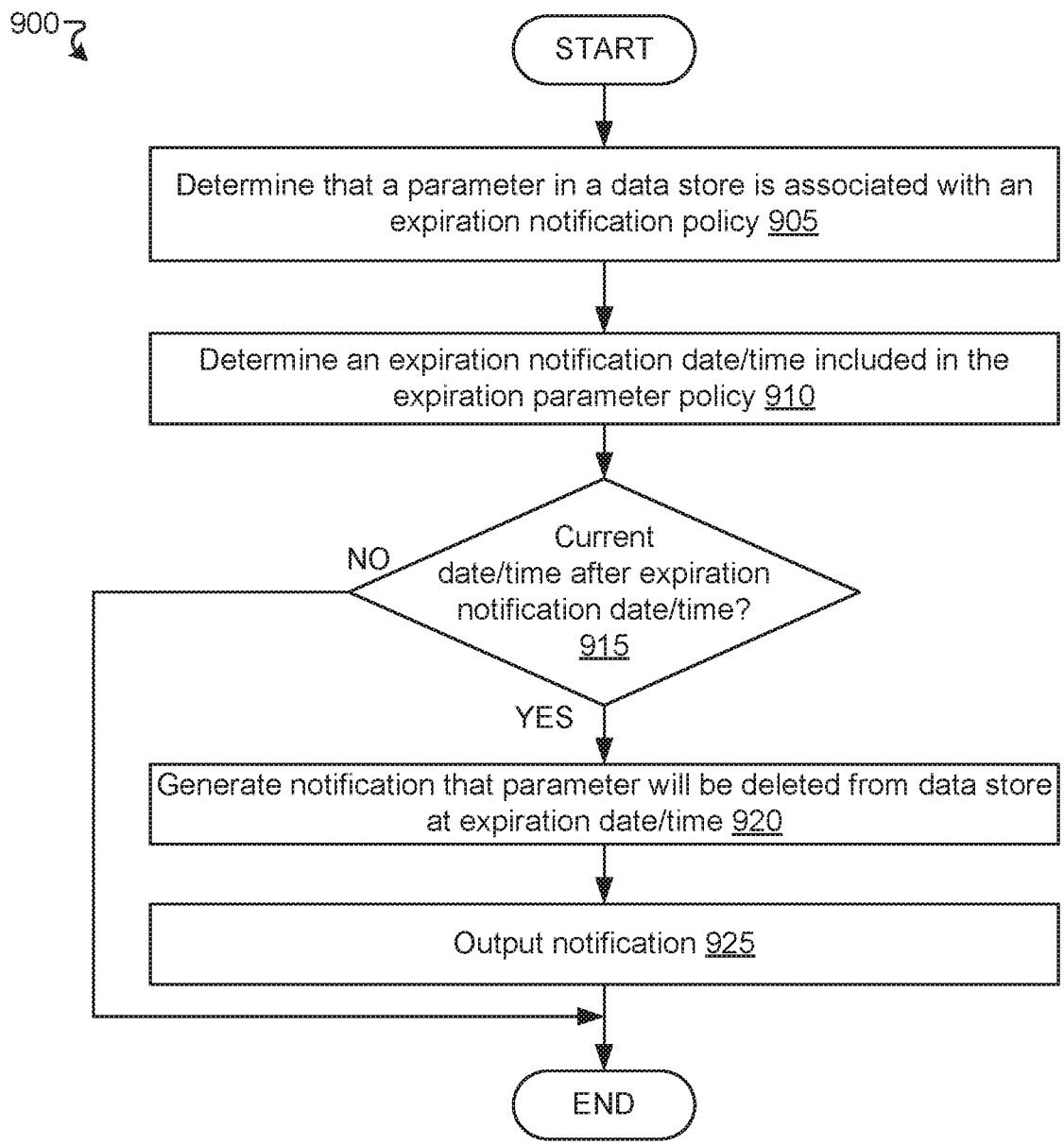
FIG. 9 is a flow chart illustrating one embodiment for a method of executing an expiration notification policy associated with a parameter.

FIG. 9 is a flow chart illustrating one embodiment for a method 900 of executing an expiration notification policy associated with a parameter. At block 905 of method 900, processing logic determines that a parameter in a data store is associated with an expiration notification policy. At block 910, processing logic determines an expiration notification date/time (e.g., timestamp) included in the expiration notification parameter policy.

At block 915, processing logic determines whether a current date/time (e.g., timestamp) is after the expiration notification date/time. If the current date/time is not after the expiration notification date/time, the method ends. If the current date/time is after the expiration notification date/time, the method continues to block 920.

At block 920, processing logic generates a notification that the parameter will be deleted from the data store at the expiration date/time. At block 925, processing logic outputs the notification.

Figure 10:
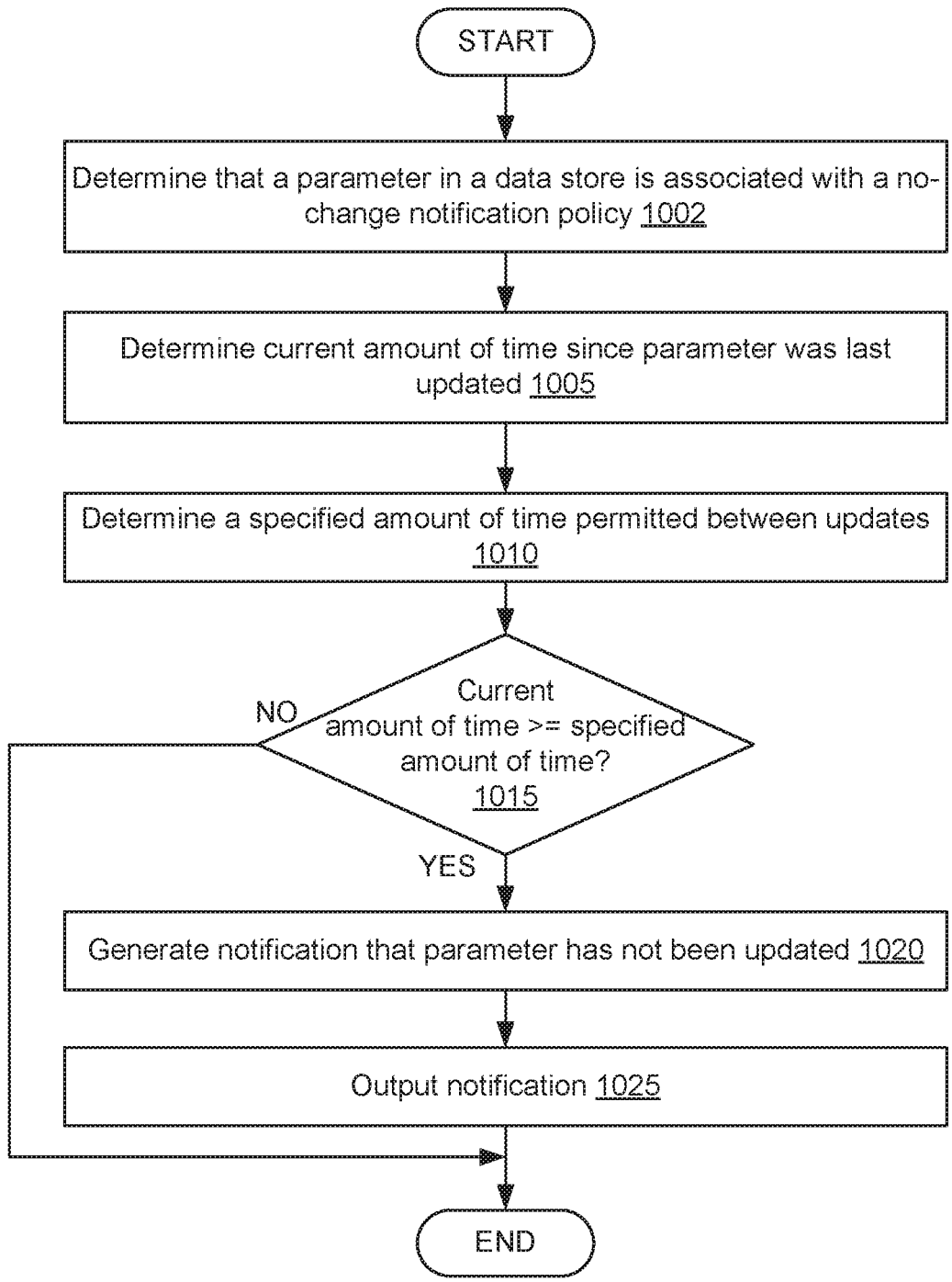
FIG. 10 is a flow chart illustrating one embodiment for a method of executing a no-change notification policy associated with a parameter.

FIG. 10 is a flow chart illustrating one embodiment for a method 1000 of executing a no-change notification policy associated with a parameter. At block 1002 of method 1000, processing logic determines that a parameter in a data store is associated with a no-change notification policy. At block 1005, processing logic determines a current amount of time that has passed since the parameter was last updated. At block 1010, processing logic determines a specified amount of time permitted between updates. At block 1015, processing logic determines whether the current amount of time is greater than or equal to the specified amount of time. If the current amount of time is greater than or equal to the specified amount of time, the method continues to block 1020. Otherwise the method ends.

In one embodiment, the no-change notification policy is updated each time the associated parameter is modified. At the time that the parameter is modified, a notification date/time may be determined based on the specified amount of time permitted between updates to the parameter. The determined notification date/time may then be added to the no-change notification policy. In such an embodiment, at block 1015 processing logic would determine whether a current date/time is later than the date/time included in the no-change notification policy.

At block 1020, processing logic generates a notification that the parameter has not been updated. At block 1025, processing logic outputs the notification.

Figure 11:
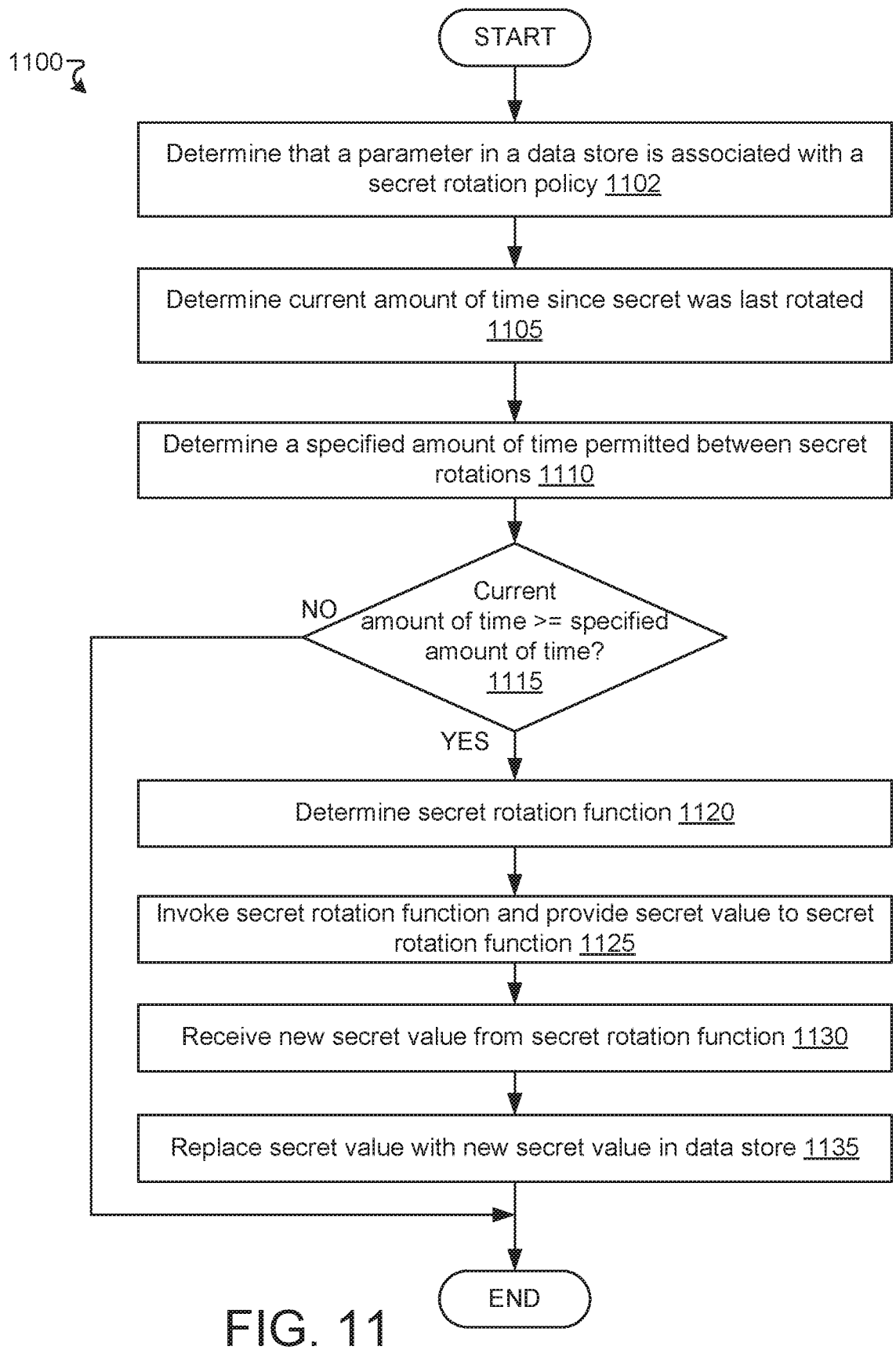
FIG. 11 is a flow chart illustrating one embodiment for a method of executing secret rotation policy associated with a parameter.

FIG. 11 is a flow chart illustrating one embodiment for a method 1100 of executing secret rotation policy associated with a parameter. At block 1102 of method 1100, processing logic determines that a parameter in a data store is associated with a secret rotation policy (or other resource rotation policy). At block 1105, processing logic determines a current amount of time that has passed since the parameter was last updated. At block 1110, processing logic determines a specified amount of time permitted between secret rotations (e.g., between changes to a secret value included in a secret parameter). At block 1115, processing logic determines whether the current amount of time is greater than or equal to the specified amount of time. If the current amount of time is greater than or equal to the specified amount of time, the method continues to block 1120. Otherwise the method ends.

In one embodiment, the secret rotation policy is updated each time the associated parameter is modified. At the time that the parameter is modified, a secret rotation date/time may be determined based on the specified secret rotation frequency. The determined secret rotation date/time may then be added to the secret rotation policy. In such an embodiment, at block 1115 processing logic would determine whether a current date/time is later than the date/time included in the secret rotation policy.

At block 1120, processing logic determines a secret rotation function. The secret rotation function may be a local function or an external function hosted by a third party service or client. The secret rotation function may be, for example, a lambda function, a nimble function, a serverless function, and so on.

At block 1125, processing logic invokes the secret rotation function. In one embodiment, processing logic makes a call to an API associated with the secret rotation function. In one embodiment, processing logic uses a webhook to call the secret rotation function. Processing logic may include a current secret value of the parameter in the call to the secret rotation function in embodiments.

The secret rotation function may perform one or more unknown operations to generate a new secret value. At block 1130, processing logic may then receive the new secret value from the secret rotation function. At block 1135, processing logic replaces the current secret value for the parameter with the new secret value in the data store.

Figure 12:
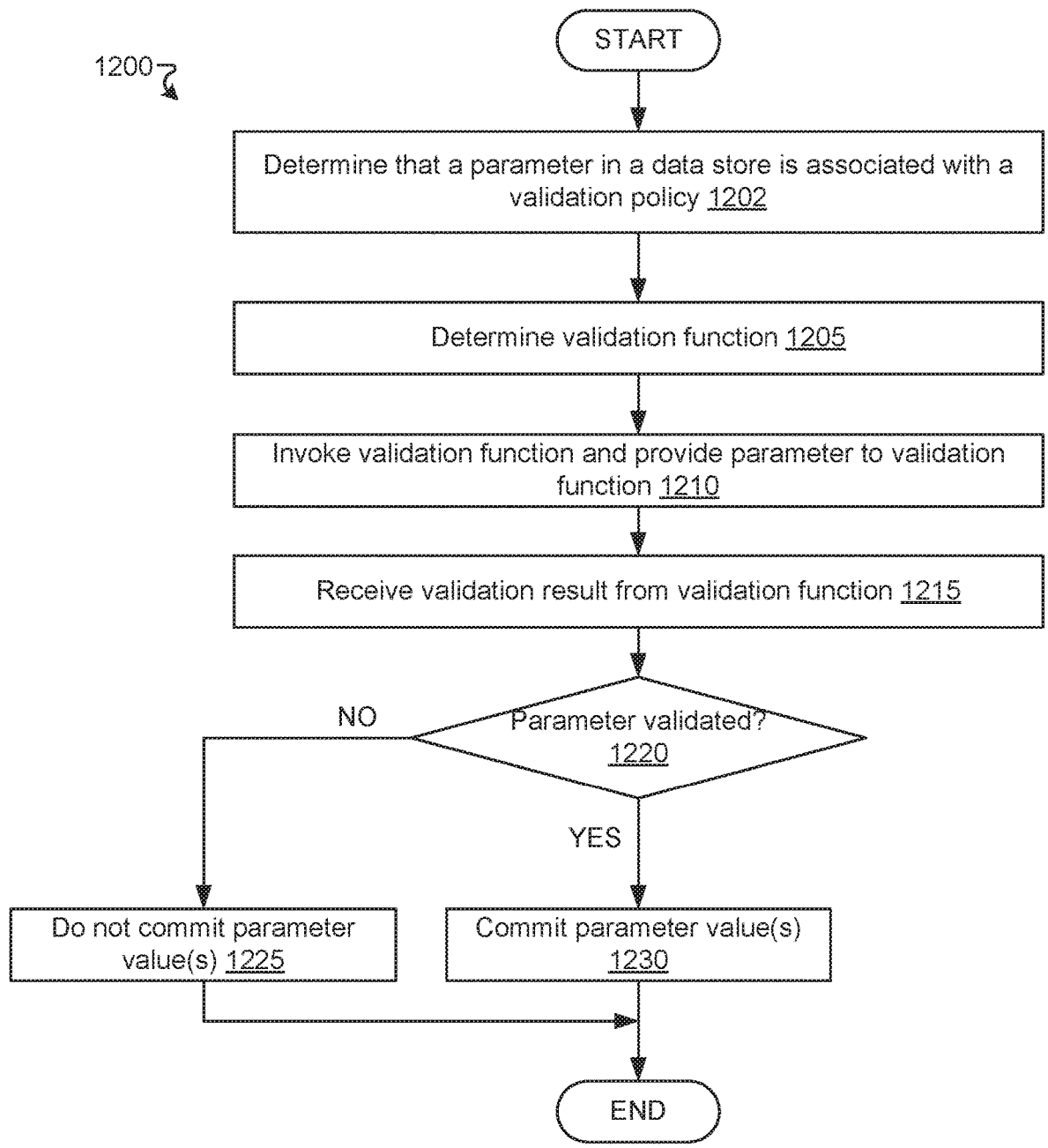
FIG. 12 is a flow chart illustrating one embodiment for a method of executing a validation policy associated with a parameter.

FIG. 12 is a flow chart illustrating one embodiment for a method 1200 of executing a validation policy associated with a parameter. At block 1202 of method 1200, processing logic determines that a parameter in a data store is associated with a validation policy. The parameter may be a new parameter or may be a recently updated parameter. In either instance, the validation policy may specify that the parameter is to be validated before it can be committed to a data store.

At block 1205, processing logic determines a validation function. The validation function may be a local function or an external function hosted by a third party service or client. The validation function may be, for example, a serverless function.

At block 1210, processing logic invokes the validation function. In one embodiment, processing logic makes a call to an API associated with the validation function. In one embodiment, processing logic uses a webhook to call the validation function. Processing logic may include a value of the parameter in the call to the validation function in embodiments.

The validation function may perform one or more unknown operations to determine whether to validate the parameter. The validation function may then generate a result indicating whether or not the parameter is successfully validated. The result may be a Boolean value (e.g., TRUE or FALSE), or may be a binary value (e.g., 1 for validated or 0 for not validated), for example. At block 1215, processing logic may then receive the validation result.

At block 1220, processing logic determines whether the validation result received from the validation function indicates that the parameter was successfully validated. If the parameter was successfully validated, the method continues to block 1230 and the parameter is committed (or one or more updates to parameter values for the parameter are committed). If the parameter is not validated, then the method proceeds to block 1225 and the parameter or parameter values are not committed. This may include rolling back one or more values of the parameter if the parameter was a preexisting parameter.

Figure 13:
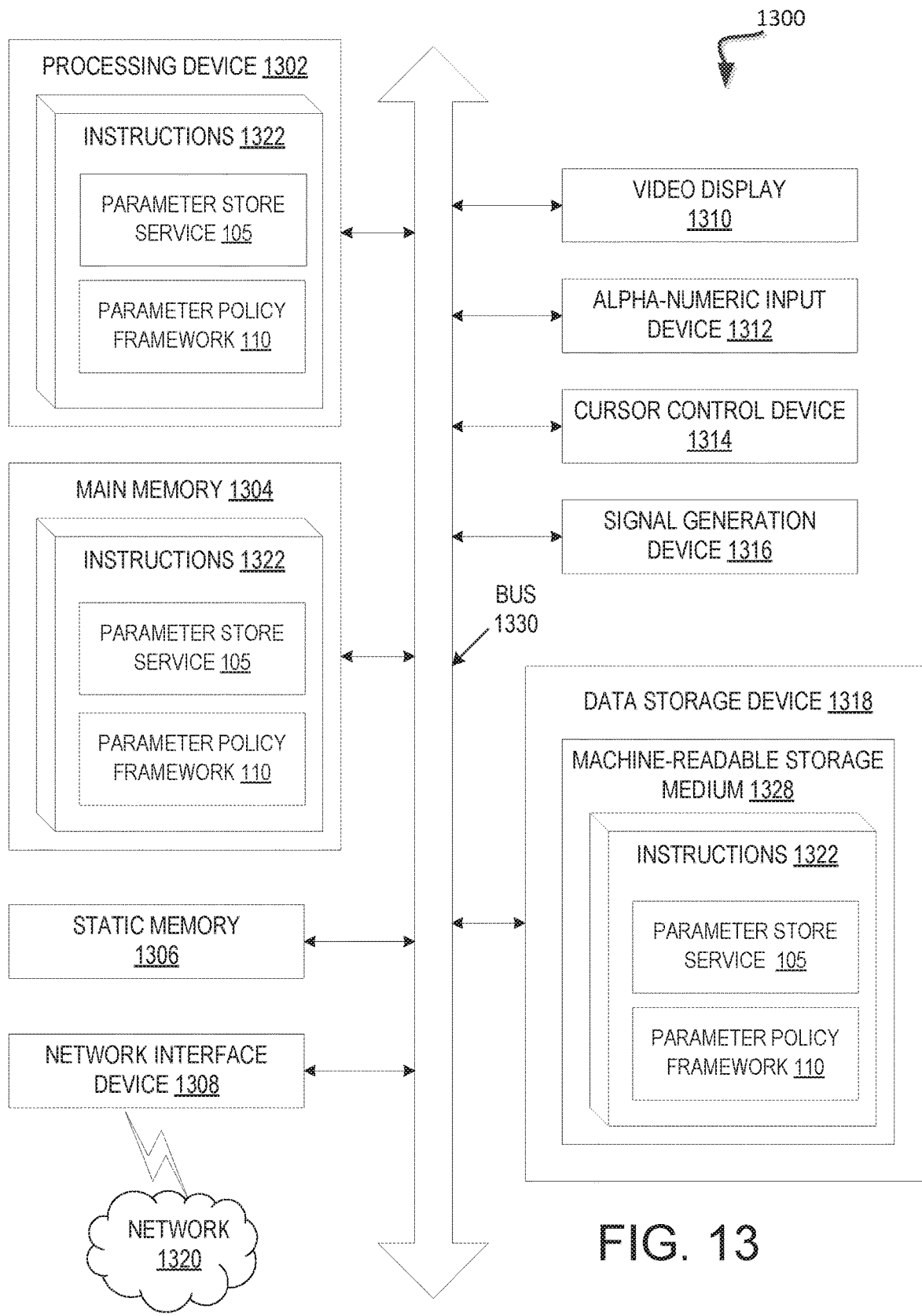
FIG. 13 is a schematic block diagram that provides one example illustration of a computing device executing a parameter store, according to one embodiment of the present disclosure.

FIG. 13 illustrates a diagrammatic representation of a machine in the exemplary form of a computer system (computing device) 1300 within which a set of instructions, for causing the machine to perform any one or more of the methodologies discussed herein, may be executed. The system 1300 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1300 includes a processing device (e.g., one or more processor) 1302, a main memory 1304 (e.g., read-only memory (ROM), flash memory, dynamic random access memory (DRAM) such as synchronous DRAM (SDRAM)), a static memory 1306 (e.g., flash memory, static random access memory (SRAM)), and a data storage device 1318, which communicate with each other via a bus 1330.

Processing device 1302 represents one or more general-purpose processing devices such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. The processing device 1302 is configured to execute instructions for the parameter store service 105 and/or for the parameter policy framework 110 in embodiments.

The computer system 1300 may further include a network interface device 1308. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker).

The data storage device 1318 may include a computer-readable storage medium 1328 on which is stored one or more sets of instructions of the parameter store 1352 embodying any one or more of the methodologies or functions described herein. The instructions may also reside, completely or at least partially, within the main memory 1304 and/or within processing logic of the processing device 1302 during execution thereof by the computer system 1300, the main memory 1304 and the processing device 1302 also constituting computer-readable media.

While the computer-readable storage medium 1328 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "generating", "attaching", "performing", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present disclosure are described with reference to Java 8, JML and Open JML. However, it should be understood that the principles and techniques set forth herein may be applied to other programming languages that have both imperative programming features and functional programming features. Accordingly, it will be appreciated that a variety of programming languages may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    determining, by a processing device, that a parameter in a data store for configuration data management and secrets management of a computer system is associated with a parameter policy, wherein the parameter comprises a key-value pair and the parameter policy comprises metadata about the parameter and one or more operations that at least one of add, remove, change, or identify, a behavioral characteristic of the parameter, wherein the parameter policy is managed directly without modifying the parameter, and wherein the parameter is one of a plurality of parameters stored in the data store;
    receiving instructions to attach the parameter policy to the parameter;
    receiving configuration information for the parameter policy;
    generating the parameter policy from a parameter policy base class having a parameter policy type, the parameter policy having the configuration information;
    attaching the parameter policy to the parameter wherein the parameter policy is specific to the parameter such that the parameter policy comprises one or more operations only associated with the parameter;
    determining, by the processing device, a criterion included in the parameter policy, wherein the criterion comprises a first value;
    determining, by the processing device, that the criterion is satisfied by determining a value included in the metadata meets, exceeds, or fails to meet the first value;
    determining, by the processing device, the one or more operations in the parameter policy; and
    performing the one or more operations.

2. The method of claim 1, wherein the parameter policy comprises an expiration policy, wherein the criterion comprises a first date and time, and wherein the one or more operations comprise deletion of the parameter, the method comprising:
    determining the criterion is satisfied by determining that a current date and time is after the first date and time; and
    deleting the parameter from the data store, wherein no record of the parameter exists in the data store after deletion of the parameter from the data store.

3. The method of claim 1, wherein the parameter policy comprises an expiration notification policy, and wherein the criterion comprises a second date and time that is a distance in time from a first date and time included in an associated expiration policy, the method comprising:
    determining that the criterion is satisfied by determining that a current date and time is after the second date and time;
    generating a notification that the parameter will be deleted at the first date and time; and
    outputting the notification.

4. The method of claim 1, wherein the parameter policy comprises a no-change notification policy, and wherein the criterion comprises a first amount of time between a current date and time and a previous date and time at which the parameter was last modified, the method comprising:
    determining a current amount of time between the current date and time and the previous date and time at which the parameter was last modified;
    determining the criterion is satisfied by determining that the current amount of time corresponds to or is greater than the first amount of time;
    generating a notification that the parameter has not been modified for the first amount of time; and
    outputting the notification.

5. The method of claim 1, wherein the parameter is a secret having a secret value, wherein the parameter policy comprises a secret rotation policy for the secret, and wherein the criterion comprises a first amount of time between a current date and time and a previous date and time at which the secret was last replaced, the method comprising:
  determining a current amount of time between the current date and time and the previous date and time at which the secret was last replaced;
  determining the criterion is satisfied by determining that the current amount of time corresponds to or is greater than the first amount of time;
  determining a secret rotation function associated with the secret rotation policy, wherein the secret rotation function is a serverless function comprising business logic;
  invoking the secret rotation function;
  providing the secret value to the secret rotation function;
  receiving a new secret value for the secret from the secret rotation function; and
  storing the new secret value for the secret in the data store.

6. The method of claim 1, wherein the parameter policy comprises a validation policy for the parameter, the method comprising:
  determining that a value for the parameter is newly added or recently updated;
  determining a validation function associated with the validation policy, wherein the validation function is one of a serverless function comprising business logic;
  invoking the validation function;
  receiving a Boolean result from the validation function, wherein the Boolean result indicates that the parameter is validated; and
  committing the value for the parameter.

7. The method of claim 1, further comprising:
  receiving a plugin comprising the parameter policy, wherein the parameter policy comprises a webhook that invokes a third party function;
  invoking the third party function using the webhook responsive to determining that the criterion is satisfied; and
  receiving a result from the third party function.

8. A system, comprising:
  a hierarchical data store to store a plurality of parameters for configuration data management and secrets management of a computer system, a first parameter of the plurality of parameters comprising at least one of a secret or a configuration parameter associated with the computer system, wherein the secret or configuration parameter is represented as a key-value pair; and
  a processing device connected to the hierarchical data store, the processing device to:
    determine that the first parameter in the hierarchical data store is associated with a parameter policy, wherein the parameter policy comprises metadata about the parameter and one or more operations that at least one of add, remove, change, or identify a behavioral characteristic of the parameter, and wherein first parameter policy is managed directly without modifying the parameter;
    receive instructions to attach the parameter policy to the parameter;
    receive configuration information for the parameter policy;
    generate the parameter policy from a parameter policy base class comprising a predefined parameter policy type, the parameter policy having the configuration information;
    attach the parameter policy to the parameter, wherein the parameter policy is specific to the parameter, such that the parameter policy comprises one or more operations only associated with the parameter;
    determine a criterion and a first value associated with the criterion included in the parameter policy;
    determine that the criterion is satisfied by determining a value included in the metadata meets, exceeds, or fails to meet the first value;
    determine the one or more operations in the parameter policy; and
    perform the one or more operations.

9. The system of claim 8, wherein the parameter policy comprises an expiration policy, wherein the criterion comprises a first date and time, wherein the one or more operations comprise deletion of the first parameter, and wherein the processing device is further to:
  determine that a current date and time is after the first date and time to determine the criterion is satisfied; and
  delete the first parameter from the hierarchical data store, wherein no record of the first parameter exists in the hierarchical data store after deletion of the first parameter from the hierarchical data store.

10. The system of claim 8, wherein the parameter policy comprises an expiration notification policy, wherein the criterion comprises a second date and time that is a distance in time from a first date and time included in an associated expiration policy, and wherein the processing device is further to:
  determine that a current date and time is after the second date and time to determine the criterion is satisfied;
  generate a notification that the first parameter will be deleted at the first date and time; and
  output the notification.

11. The system of claim 8, wherein the parameter policy comprises a no-change notification policy, wherein the criterion comprises a first amount of time between a current date and time and a previous date and time at which the first parameter was last modified, and wherein the processing device is further to:
  determine a current amount of time between the current date and time and the previous date and time at which the first parameter was last modified;
  determine that the current amount of time corresponds to or is greater than the first amount of time to determine the criterion is satisfied;
  generate a notification that the first parameter has not been modified for the first amount of time; and
  output the notification.

12. The system of claim 8, wherein the first parameter is a secret having a secret value, wherein the parameter policy comprises a secret rotation policy for the secret, wherein the criterion comprises a first amount of time between a current date and time and a previous date and time at which the secret was last replaced, and wherein the processing device is further to:
  determine a current amount of time between the current date and time and the previous date and time at which the secret was last replaced;
  determine that the current amount of time corresponds to or is greater than the first amount of time to determine the criterion is satisfied;
  determine a secret rotation function associated with the secret rotation policy;
  invoke the secret rotation function;
  provide the secret value to the secret rotation function;
  receive a new secret value for the secret from the secret rotation function; and store the new secret value for the secret in the hierarchical data store.

13. The system of claim 12, wherein the secret rotation function is a serverless function comprising business logic.

14. The system of claim 8, wherein the parameter policy comprises a validation policy for the first parameter, and wherein the processing device is further to:
   determine that a value for the first parameter is newly added or recently updated;
   determine a validation function associated with the validation policy, wherein the validation function is a serverless function comprising business logic;
   invoke the validation function;
   receive a Boolean result from the validation function, wherein the Boolean result indicates that the first parameter is validated; and
   commit the value for the first parameter.

15. The system of claim 8, wherein the processing device is further to:
   receive a plugin comprising the parameter policy, wherein the parameter policy comprises a webhook that invokes a third party function;
   invoke the third party function using the webhook responsive to determining that the criterion is satisfied; and
   receive a result from the third party function.

16. A non-transitory machine-readable storage medium comprising instructions that, when executed by a processing device, cause the processing device to:
   determine, that a parameter in a data store for configuration data management and secrets management of a computer system is associated with a parameter policy, wherein the parameter comprises a key-value pair and the parameter policy comprises metadata about the parameter and one or more operations that at least one of add, remove, change, or identify, a behavioral characteristic of the parameter, and wherein the parameter policy is managed directly without modifying the parameter, and wherein the parameter is one of a plurality of parameters stored in the data store;
   receive a first request to attach the parameter policy to the parameter;
   receive first configuration information for the parameter policy;
   generate the parameter policy from a parameter policy base class having a parameter policy type, the parameter policy having the configuration information;
   attach the parameter policy to the parameter wherein the parameter policy is specific to the parameter such that the parameter policy comprises one or more operations only associated with the parameter;
   determine, a first criterion included in the parameter policy, wherein the first criterion comprises a first value;
   determine that the first criterion is satisfied by determining a value included in the metadata meets, exceeds, or fails to meet the first value;
   determine the one or more operations in the parameter policy; and
   perform the one or more operations in the parameter policy.

17. The non-transitory machine-readable storage medium of claim 16, wherein instructions further cause the processing device to:
   receive a second request to attach a second parameter policy to the parameter, the second request comprising a selection of a second parameter policy type included in the parameter policy base class;
   receive second configuration information for the second parameter policy, the second configuration information comprising a second value;
   compute a third value for a second criterion based on the first value for the first criterion and the second value;
   generate the second parameter policy from the parameter policy base class and the third value, wherein the second parameter policy comprises second metadata that add, removes, or changes, or identifies the behavioral characteristic of the parameter; and
   attach the second parameter policy to the parameter, wherein the second parameter policy is specific to the parameter such that the second parameter policy comprises one or more operations only associated with the parameter.

18. The non-transitory machine-readable storage medium of claim 17, wherein the instructions further cause the processing device to:
   receive a plugin comprising a second parameter policy, wherein the second parameter policy comprises a second criterion and a webhook that invokes a third party function;
   attach the second parameter policy to the parameter;
   determine that the second criterion is satisfied;
   invoke the third party function using the webhook; and
   receive a result from the third party function.

19. The non-transitory machine-readable storage medium of claim 17, wherein the parameter policy comprises a no-change notification policy, wherein the criterion comprises a first amount of time between a current date and time and a previous date and time at which the parameter was last modified, and wherein the instructions further cause the processing device to:
   determine a current amount of time between the current date and time and the previous date and time at which the parameter was last modified;
   determine that the current amount of time corresponds to or is greater than the first amount of time to determine the criterion is satisfied;
   generate a notification that the parameter has not been modified for the first amount of time; and
   output the notification.

20. The non-transitory machine-readable storage medium of claim 17, wherein the parameter is a secret having a secret value, wherein the parameter policy comprises a secret rotation policy for the secret, wherein the criterion comprises a first amount of time between a current date and time and a previous date and time at which the secret was last replaced, and wherein the instructions further cause the processing device to:
   determine a current amount of time between the current date and time and the previous date and time at which the secret was last replaced;
   determine that the current amount of time corresponds to or is greater than the first amount of time to determine the criterion is satisfied;
   determine a secret rotation function associated with the secret rotation policy;
   invoke the secret rotation function;
   provide the secret value to the secret rotation function;
   receive a new secret value for the secret from the secret rotation function; and
   store the new secret value for the secret in the data store.

* * * * *